(12) United States Patent
Hsieh

(10) Patent No.: US 7,492,567 B2
(45) Date of Patent: Feb. 17, 2009

(54) ELECTROMAGNETIC INDUCTION SWITCH CIRCUIT

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 11/757,403

(22) Filed: Jun. 4, 2007

(65) Prior Publication Data

US 2008/0150498 A1    Jun. 26, 2008

(30) Foreign Application Priority Data

Dec. 26, 2006    (CN) .................. 2006 1 0201414

(51) Int. Cl.
*H01H 47/00* (2006.01)
(52) U.S. Cl. ..................................................... 361/147
(58) Field of Classification Search .................. 361/147
See application file for complete search history.

(56) References Cited

U.S. PATENT DOCUMENTS

| | | | | |
|---|---|---|---|---|
| 2,901,676 | A | * | 8/1959 | Mittag .......................... 361/208 |
| 3,332,229 | A | * | 7/1967 | Klinck et al. ................ 368/162 |
| 3,414,796 | A | * | 12/1968 | Henquet ...................... 320/108 |
| 5,975,714 | A | * | 11/1999 | Vetorino et al. ............. 362/192 |
| 6,426,858 | B1 | * | 7/2002 | Schroeder .................... 361/166 |
| 6,621,668 | B1 | * | 9/2003 | Sare ............................ 361/13 |

* cited by examiner

*Primary Examiner*—Ronald W Leja
(74) *Attorney, Agent, or Firm*—Frank R. Niranjan

(57) ABSTRACT

An exemplary electromagnetic induction switch includes a coil, a magnet suspended in the coil, a rectification circuit, and a relay-switch. The coil is connected between two input terminals of the rectification circuit. Two output terminals of the rectification circuit are respectively connected to two relay leads of the relay-switch. One of two switch leads of the relay-switch is connected to a working circuit, and another one of the switch leads of the relay-switch is connected to the working circuit via a power source, thereby controlling the power source supplying power to the working circuit.

7 Claims, 1 Drawing Sheet

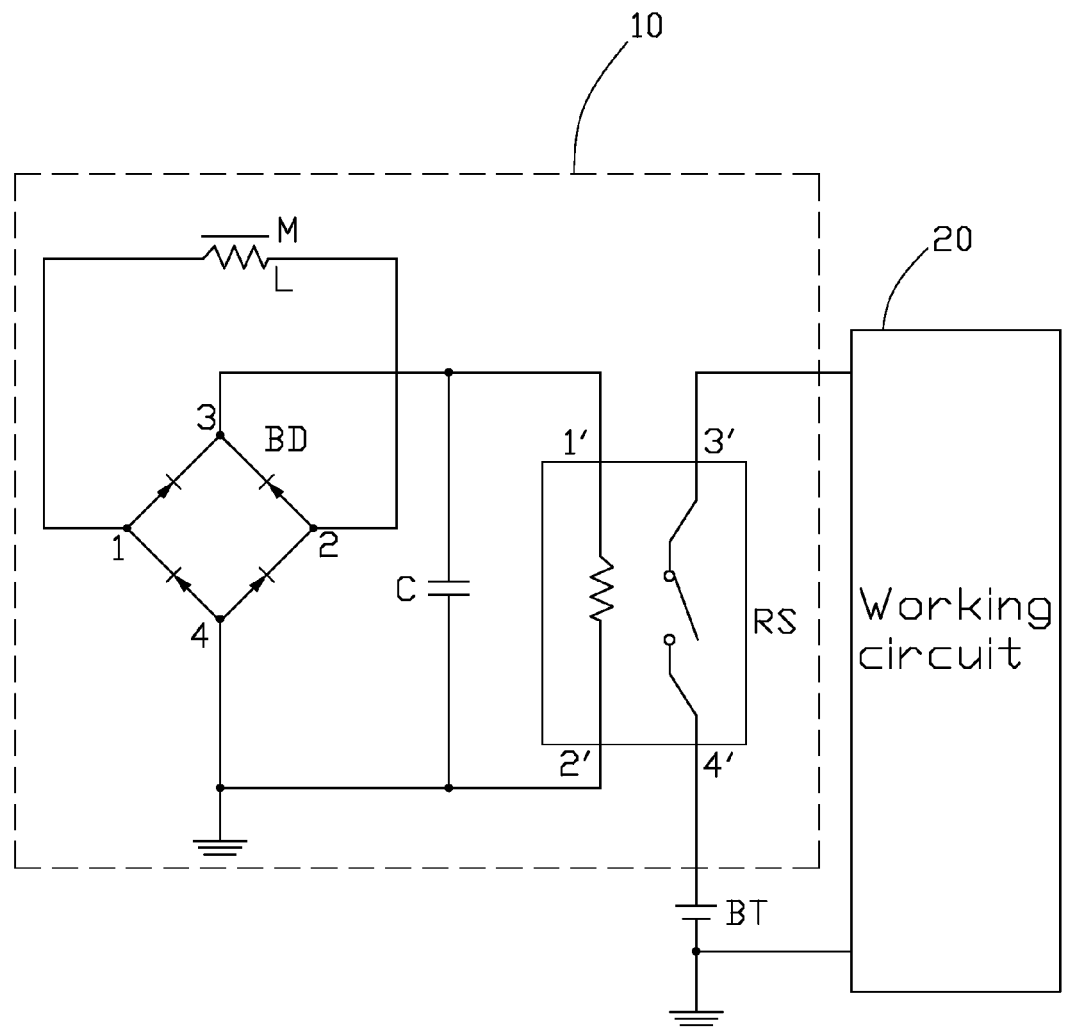

ELECTROMAGNETIC INDUCTION SWITCH CIRCUIT

BACKGROUND OF THE INVENTION

1. Field of the Invention

The present invention relates to electrical switches, and particularly to an electromagnetic induction switch circuit.

2. Description of Related Art

An ordinary laser pen includes a battery, a working circuit comprising a laser diode driver (LD driver) and a laser module, and a switch for selectively coupling the battery with the working circuit. Users can turn on and turn off the laser pen by operating a button, which connects to the switch.

Therefore, users must manually press the button to turn on the laser pen when they want to use it, and have to press the button again to turn off the laser pen when not using it, to save power. It is inconvenient for users to operate the switch when they use the laser pen frequently. Oftentimes, users forget to turn off the laser pen when not using it, which results in waste of power.

Therefore, an electromagnetic induction switch circuit which can automatically turn a laser pen on or off is needed.

SUMMARY OF THE INVENTION

An exemplary electromagnetic induction switch includes a coil, a magnet suspended in the coil, a rectification circuit, and a relay-switch. The coil is connected between two input terminals of the rectification circuit. Two output terminals of the rectification circuit are respectively connected to two relay leads of the relay-switch. One of two switch leads of the relay-switch is connected to a working circuit, and another one of the switch leads of the relay-switch is connected to the working circuit via a power source, thereby controlling the power source supplying power to the working circuit. The coil generates an alternating current due to relative motion between the coil and magnetic lines of the magnet for operating the relay-switch to couple the working circuit with the battery when the magnet is moving in the coil when using a laser pen employing the induction switch.

Other advantages and novel features will become more apparent from the following detailed description when taken in conjunction with the accompanying drawing, in which:

BRIEF DESCRIPTION OF THE DRAWINGS

The drawing is a circuit diagram of one embodiment of an electromagnetic induction switch circuit in accordance with the present invention.

DETAILED DESCRIPTION OF THE INVENTION

Referring to the drawing, an electromagnetic induction switch circuit 10 in accordance with a preferred embodiment of the present invention includes a coil L, a magnet M, a rectifier bridge circuit BD, a capacitor C, and a relay-switch RS. The rectifier bridge BD includes two input terminals 1 and 2, and two output terminals 3 and 4. The relay-switch RS includes a relay portion with two relay leads 1' and 2', and a switch portion with two switch leads 3' and 4'.

The magnet M is suspended in the coil L which is connected between the input terminals 1 and 2 of the rectifier bridge circuit BD. The output terminals 3 and 4 of the rectifier bridge circuit BD are respectively connected to the relay leads 1' and 2' of the relay-switch RS. The switch lead 3' of the relay-switch RS is connected to a working circuit 20 of a laser pen, and the switch lead 4' is connected to the working circuit 20 via a battery BT for forming a loop with the switch lead 3' via the working circuit 20. The capacitor C is connected between the relay leads 1' and 2' of the relay-switch RS.

When the laser pen is being used, movement of the pen causes the magnet M to move about within the coil L. Therefore, an alternating current is generated in the coil L due to relative motion between the coil L and magnetic lines of the magnet M. The rectifier bridge circuit BD converts the alternating current to a direct current, and transmits it to the relay portion of the relay-switch RS via the relay leads 1' and 2' to short the switch portion of the relay-switch RS. Therefore, the working circuit will be turned on by connecting to the battery BT.

The capacitor C stores electric energy when the magnet M is moving, and discharges the electric energy when the magnet M stops moving for keeping the laser pen working during brief lapses in movement of the pen. The laser pen will turn off after the capacitor C discharges its stored energy.

The laser pen will turn on automatically during movement of the laser pen, and will turn off when the laser pen is motionless longer than a time required for the capacitor C to discharge. Other electronic aids, such as flashlights and microphones, can also use this electromagnetic induction switch circuit 10 for turning on or off automatically.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electromagnetic induction switch comprising:
   a coil with two ends;
   a magnet suspended within the coil;
   a rectification circuit with two input terminals each respectively connected to a corresponding one of the ends of the coil, and two output terminals; and
   a relay-switch with two relay leads respectively connected to the output terminals of the rectification circuit, and two switch leads, wherein one of the switch leads is connected to a working circuit, and another one of the switch leads is connected to the working circuit via a power source, thereby controlling the power source supplying power to the working circuit.

2. The electromagnetic induction switch as claimed in claim 1, further comprising a capacitor coupled between the two relay leads of the relay-switch.

3. An electronic device comprising:
   a working circuit;
   a power source connected to the working circuit configured for supplying power to the working circuit;
   a relay-switch controlling the power source supplying power to the working circuit, the relay-switch comprising a relay portion and a switch portion;

a coil with a magnet suspended therein, during movement of the electronic device, the magnet moves relative to the coil so that the coil generates an alternating current; and a rectification circuit comprising two input terminals connecting to two opposite terminals of the coil to receive the alternating current and converting it to a direct current, and two output terminals connecting to two opposite leads of the relay portion of the relay-switch to output the direct current to the relay portion to thereby short the switch portion of the relay-switch for allowing the power source to supply power to the working circuit.

4. The electronic device as claimed in claim 3, further comprising a capacitor coupled between the two relay leads of the relay portion of the relay-switch.

5. The electronic device as claimed in claim 3 is a laser pen.

6. The electronic device as claimed in claim 3 is a flashlight.

7. The electronic device as claimed in claim 3 is a microphone.

* * * * *